(No Model.)

W. B. DRAPER.
CLASP.

No. 513,094.

Patented Jan. 23, 1894.

WITNESSES
Charles B. Crocker.
Eva S. Rounds.

INVENTOR
William B. Draper.
by B. J. Hayes
Atty.

UNITED STATES PATENT OFFICE.

WILLIAM B. DRAPER, OF CAMBRIDGE, MASSACHUSETTS.

CLASP.

SPECIFICATION forming part of Letters Patent No. 513,094, dated January 23, 1894.

Application filed July 31, 1893. Serial No. 481,913. (No model.)

*To all whom it may concern:*

Be it known that I, WILLIAM B. DRAPER, of Cambridge, county of Middlesex, State of Massachusetts, have invented an Improvement in Clasps, of which the following description, in connection with the accompanying drawings, is a specification, like letters on the drawings representing like parts.

This invention has for its object to improve the construction of clasps especially applicable for hose-supporters, yet adapted for other purposes.

In accordance with this invention, the clasp consists of two parts or members, one of which has a circular projection provided at one side at or near its base with a slit extending ninety degrees or more, and the other of which members has a recess shaped to receive said circular projection, and provided upon one side with an inwardly extended projection adapted to enter the slit in the projection of the other member, said inwardly extended projection being made much narrower than the length of the slit, so that the members may have a movement of say ninety degrees, one with relation to the other.

Figure 1:
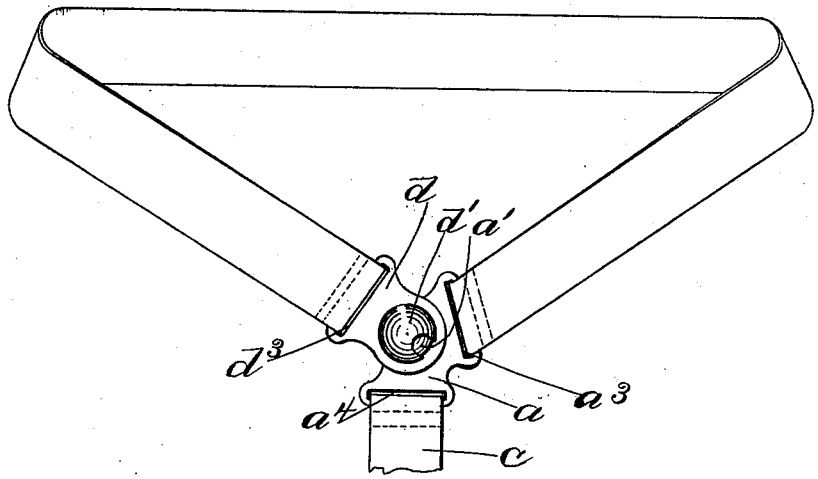
Figure 2:
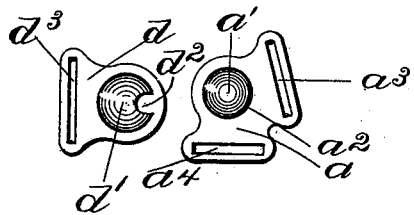
Figure 3:
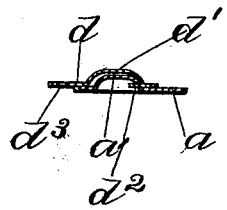

Figure 1, shows in front elevation a clasp embodying this invention connected to a hose-supporter of ordinary construction. Fig. 2, shows the two members of the clasp separated; Fig. 3, a cross-section of the clasp shown in Fig. 1, taken on the dotted lines $x$—$x$.

The plate $a$, has formed or struck up in it, a circular projection $a'$ having a convex outer face, and at or near the base of said circular projection $a'$ a slit $a^2$ is formed, which is extended for say ninety degrees more or less. This plate is herein shown as having two slots $a^3$, $a^4$, which receive the bands $b$, $c$, yet when the clasp is employed for other purposes than for hose-supporters, these slots may be omitted and other means employed for attaching the plate $a$. The plate $d$ which forms the other member of the clasp, has a circular recess formed in it, which is herein shown as formed by striking up a projection $d'$, similar to the projection $a'$, and of suitable size to be placed upon and thereby embrace the projection $a'$. A projection $d^2$ is formed on the plate $d$, extending inwardly into the recess which receives the projection $a'$, said projection being designed to enter the slit $a^2$ formed in the projection $a'$. The projection $d^2$ is made much narrower than the length of the slit $a^2$, so as to move therein freely from end to end, permitting the plates $d$ and $a$, to have a movement of say ninety degrees, one with relation to the other. It will be seen that by placing the recessed plate upon the projection $a'$ of the plate $a$, and permitting the projection $d^2$ to enter the slit $a^2$, the parts or members of the clasp will be connected together. The plate $d^2$ is herein shown as having a slot $d^3$ to receive the other end of the band $b$, but it may be otherwise formed to be attached to a band or other thing.

I claim—

The clasp herein described comprising the plate $a$ having a circular projection $a'$ provided with an elongated slit $a^2$ at its base, and the plate $d$ having a circular recess to receive the projection $a'$, and a projection $d^2$ formed by partially cutting out and bending in a portion of the same, substantially as described.

In testimony whereof I have signed my name to this specification in the presence of two subscribing witnesses.

WILLIAM B. DRAPER.

Witnesses:
B. J. NOYES,
EVA S. ROUNDS.